United States Patent
Li et al.

[11] Patent Number: 5,729,427
[45] Date of Patent: Mar. 17, 1998

[54] MACROCYCLIC COMPLEX MODIFIED ELECTRODES AND CAPACITORS MADE THEREFROM

[75] Inventors: Changming Li, Vernon Hills; Ke Keryn Lian, Palatine, both of Ill.; Anaba A. Anani, Lawrenceville, Ga.

[73] Assignee: Motorola, Inc., Schaumburg, Ill.

[21] Appl. No.: 780,557

[22] Filed: Jan. 8, 1997

[51] Int. Cl.$^6$ .................................................. H01G 9/00
[52] U.S. Cl. .......................... 361/503; 361/504; 361/508; 361/516; 361/526; 361/523; 361/525; 361/528; 361/532; 429/190; 429/191; 429/193
[58] Field of Search ...................... 361/503, 502, 361/508, 512, 516, 522, 523, 528, 530, 532, 541; 205/781.5, 783, 785, 787.3, 790, 794, 794.5; 204/424, 130, 426, 421, 427, 430; 29/25.03; 429/188, 189, 190, 194; 252/62.2

[56] References Cited

U.S. PATENT DOCUMENTS

| | | | |
|---|---|---|---|
| 4,864,472 | 9/1989 | Yoshimura et al. | 361/525 |
| 4,980,037 | 12/1990 | Hossain et al. | 204/130 |
| 5,392,191 | 2/1995 | Thomas et al. | 361/508 |
| 5,510,046 | 4/1996 | Li et al. | 252/62.2 |
| 5,518,838 | 5/1996 | Bai et al. | 429/191 |
| 5,538,813 | 7/1996 | Li | 429/192 |
| 5,552,245 | 9/1996 | Li et al. | 429/188 |
| 5,568,353 | 10/1996 | Bai et al. | 361/523 |
| 5,585,208 | 12/1996 | Lian et al. | 429/190 |
| 5,587,872 | 12/1996 | Lian et al. | 361/525 |
| 5,591,540 | 1/1997 | Louie et al. | 429/163 |
| 5,604,660 | 2/1997 | Bai et al. | 361/525 |
| 5,626,729 | 5/1997 | Thompson et al. | 204/252 |

*Primary Examiner*—Bot L. Ledynh
*Assistant Examiner*—Anthony Dinkins
*Attorney, Agent, or Firm*—Dale Dorinski; Kelly A. Gardner; Kenneth M. Massaroni

[57] ABSTRACT

Electrodes for electrochemical capacitor are modified with a metal macrocyclic complex made up of phthalocyanine or porphyrin ligands bound to a transition metal to achieve improved conductivity, reversibility, and charge storage capacity. The electrode is formed from a metal base and coated with an oxide, nitride or carbide of a transition metal or with a conductive polymer. This coating is modified with the metal macrocyclic complex. Suitable metal macrocyclic complexes are iron phthalocyanine (FePc), iron meso-tetra (N-methyl-4-phenyl)porphyrin (FeTPP) or cobalt protoporphyrin (CoPP).

9 Claims, 5 Drawing Sheets

MACROCYCLIC COMPLEX MODIFIED ELECTRODES AND CAPACITORS MADE THEREFROM

TECHNICAL FIELD

This invention relates in general to electrochemical capacitors, and more particularly, to electrodes employing metal macrocyclic complexes.

BACKGROUND

Electrochemical capacitors are a new type of energy storage system for providing high energy density and high power density. Most of the known electrochemical capacitor active materials are based on activated carbon; metals such as platinum, iridium, ruthenium, cobalt, nickel and their alloys; or conductive polymers such as polyaniline and polypyrrole. Porous electrodes made from these active materials can have high energy density. The higher the electrode porosity, the higher the energy density, but there is always a trade off. Electrodes with high porosity usually have poor conductivity. In the prior art, high power density could only be provided at the expense of sacrificing electrode reversibility and conductivity.

Previously, we have attempted to improve the performance of electrochemical capacitors by adding water-soluble macrocyclic complexes to the electrolyte (U.S. Pat. No. 5,510,046, "Modified Electrolyte for Electrochemical Cells and Cells Using Same"). While this provided a significant improvement, the performance of the capacitor remains limited by the electrodes. An improved electrode that could deliver high energy density along with good conductivity would be a welcome addition to the art.

DETAILED DESCRIPTION OF THE PREFERRED EMBODIMENT

Many of the transition metal macrocyclic complexes such as porphyrins, phthalocyanine, etc., have substantial catalytic activity for $O_2$ reduction, and thus have traditionally interested enzyme chemists. The macrocyclic ligands involve highly conjugated organic structures with delocalized pi electrons, and in their solid form, many of the macrocyclics possess very good electronic conductivity. Thus, these catalysts also interest electrochemists, as demonstrated by the previous use of metal macrocyclic complexes to modify carbon electrodes for oxygen reduction (B. E. Conway et al, "Comprehensive Treatise of Electrochemistry", Vol. 7, pp. 380, 1983 Plenum Press, New York). Our invention uses these compounds as modifiers in the electrochemical redox capacitor materials for performance improvements. Metal macrocyclic complexes such as iron phthalocyanine (FePc), iron meso-tetra(N-methyl-4-phenyl)porphyrin (FeTPP) or cobalt protoporphyrin (CoPP) are used to modify the capacitor active electrode materials to achieve improved conductivity, reversibility, and charge storage capacity.

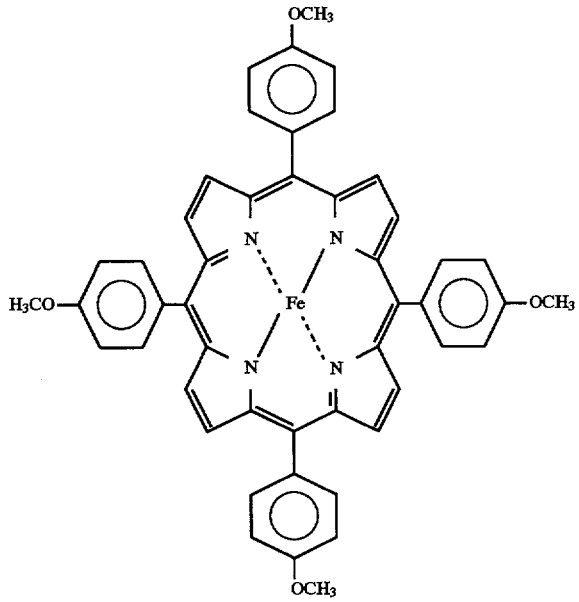

Iron meso-tetra (N-methyl-4-phenyl)porphyrin (FeTPP)

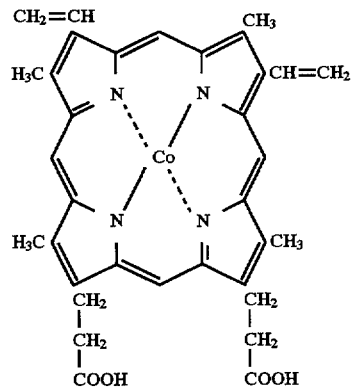

Cobalt protoporphyrin (CoPP)

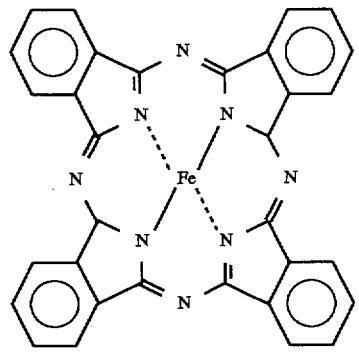

Iron phthalocyanine (FePc)

This surface modified electrode provides significantly improved energy and power density. The electrode is formed from an electrically conductive base made of materials such as Al, Ta, Ti, Zr, Bi, W, Fe, Ni, Cu or graphite. Alloys for these materials can also be used. A portion of this base is coated with a compound of Ru, Ir, Pt, Co, W, V, Fe, Ni, Mo, Ag, Zn, Pb, Mn (for example, oxides, nitrides or carbides), or a conductive polymer. Examples of useful conductive polymers include, but are not limited to, polyaniline, polypyrolle, polyfluorophenylthiopene (PFPT) and polyanisidine, and those skilled in the art will appreciate that other conductive polymers are also suitable. This coating contains a metal macrocyclic complex made up of phthalocyanine, dibenzotetraazoannulenes or porphyrin ligands bound to Co, Ni, Fe, Cu, Zn, Mn, Ti, Ru, Al, Ag, Cd, Cr, In, Mg, Pd, Pt, Rh, Si, Sn or V.

Figure 1:
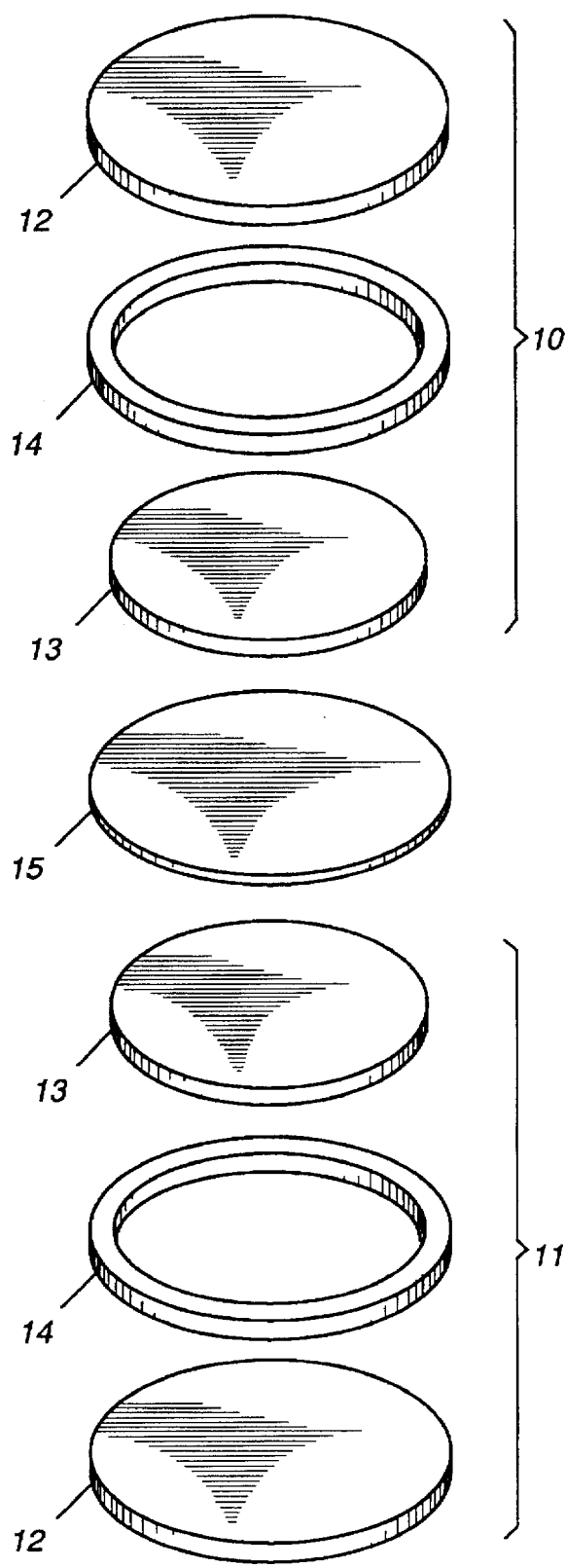
FIG. 1 is an exploded schematic view of an electrochemical capacitor in accordance with the invention.

While the specification concludes with claims defining the features of the invention that are regarded as novel, it is believed that the invention will be better understood from a consideration of the following description in conjunction with the drawing figures, in which like reference numerals are carried forward. Referring now to FIG. 1, there is illustrated an energy storage device such as an electrochemical capacitor fabricated from a pair of electrode assemblies 10 and 11, which may be the anode and the cathode of the device. In the instance in which the electrodes are fabricated of the same material, they are referred to as "symmetric electrodes". Conversely, if they are made from different materials, they are referred to as "asymmetric electrodes". Each electrode assembly includes a substrate 12 which is electrically conducting. Regardless of whether or not the electrodes are asymmetric or symmetric, the active material 13 on the substrate 12 comprises one or more materials selected from the group consisting of oxides, nitrides or carbides of Ru, Ir, Pt, Co, W, V, Fe, Ni, Mo, Ag, Zn, Pb, Mn. Alternatively, these electrodes may be fabricated of conducting polymers or activated carbon. The active material 13 also contains a metal macrocyclic complex made up of phthalocyanine or porphyrin ligands bound to Co, Ni, Fe, Cu, Zn, Mn, Ti, Ru, Al, Ag, Cd, Cr, In, Mg, Pd, Pt, Rh, Si, Sn or V. The substrate 12 is preferably chemically inert in the electrolyte 15, which lies between the electrodes. This structure thus affords free and unobstructed movement to the ions through the electrolyte. Optionally, a separator (not shown) can be used to prevent contact between the opposing electrode assemblies, since such a condition would result in a short circuit and malfunction of the electrochemical cell. A seal 14 is normally used in conjunction with the capacitor to retain the electrolyte within the capacitor. The reader will appreciate that other types of structures can also be employed to form a capacitor, and the scope of the invention is not intended to be limited by the structure of the capacitor produced with our electrodes, but only by the appended claims.

Electrodes 10 and 11 and capacitors containing these electrodes were fabricated in accordance with the invention using FePc, FeTPP and CoPP. Dichloromethane ($Cl_2C_2H_4$) was used to prepare 0.01% (by weight) solutions of FePc, FeTPP and CoPP. Samples of the various active materials were deposited on different types of substrates, and then impregnated with the metal/ligand complexes. $RuO_2$ was deposited on a thin titanium foil (hereinafter referred to as the 'MB electrode'), poly(o-anisidine) (also known as poly (2-methoxyaniline)) was deposited on a thin graphite sheet (hereinafter referred to as the 'polymer electrode'), and polyaniline was deposited on a thin titanium foil (hereinafter referred to as the 'polymer electrode'). In addition, cobalt-nickel alloy foil was also used as a substrate. To make the poly(o-anisidine) film on the graphite substrate, a solution of 0.2M poly(o-anisidine) in 0.5M $H_2SO_4$ was potential cycled. The range of the cycling voltage was −0.035 to 1.1 Volts. The polyaniline film was deposited on the titanium substrate using the same technique, after soaking the titanium foil for 5 minutes in a solution of 0.1% aqueous Zonyl® FSN fluorosurfactant sold by the Dupont Company (a mixture of 40% Telomer B monoether in polyethylene glycol, 30% isopropanol and 30% water). The coated substrates (electrodes) were then modified by soaking them in metal macrocyclic complex/dichloromethane solutions for 10 minutes and then air drying. Heat-treatment of the modified electrodes in nitrogen atmosphere for 1 hour was carried out for further performance improvement. We have previously determined that metal macrocyclic complexes were partially decomposed after heat-treatment and had much higher conductivity and better electrocatalytic performance for oxygen reduction (Changming Li, "Electrocatalysis of Oxygen Reduction with Porphyrins, MS. Thesis, May 4, 1983, Wuhan University). The heat-treatment temperature, which could be up to 1000° C. under nitrogen atmosphere, depends on the stability limitation of electrode materials. MB electrodes, polymer electrodes, and the Co—Ni foil electrodes were heat treated in a nitrogen atmosphere at 370°, 140°, and 200° C., respectively. Cyclic voltammetry (CV) was used to characterize the performance of the polymer electrodes in 1M $H_2SO_4$, using a Ag/AgCl reference electrode and a titanium fiber counter electrode. The Co—Ni foil electrode was tested in 31% KOH using a HgO reference electrode and a nickel mesh counter electrode. Bipolar capacitors were assembled from the electrodes, using a gel electrolyte. (Alternatively, solid electrolytes could also be used.) The poly(benzimidazole) (PBI) gel electrolyte acts as a matrix to contain an ion conducting species such as $H_3PO_4$. This and other polymer gel electrolytes containing $H_2SO_4$ are taught in commonly assigned, co-pending patent application Ser. No. 08/547,821 now U.S. Pat. No. 5,587,872 in the names of Lian, et al and Ser. No. 08/629,174 now U.S. Pat. No. 5,688,613 in the name of Li, et al, the disclosures of which are incorporated herein by reference. PBI electrolyte-coated MB electrodes with and without metal macrocyclic complexes were laminated to make bipolar devices according to FIG. 1. A potentiostat and a milliohmmeter were used to conduct the CV and conductivity measurements, respectively.

EXAMPLE 1

The MB material was tailored to 2.0×3.3 cm electrode sheets. Thirty-five samples were prepared and divided into 7 groups (5 samples per group). The first group was a control MB electrode that did not contain any metal/macrocylic complexes. The other six groups were modified by three different macrocyclic compound solutions. Three of these groups were heat treated. Electrode resistance measurements are shown in Table I (Thin copper foil was used to protect the $RuO_2$ electrode surface during the measurements. The resistance introduced by the copper foil was only 0.6 mΩ and is negligible.) These results demonstrate that the modification of MB electrodes with metal macrocyclic complexes improved conductivities (i.e. resistance decreased); after heat-treatment, the conductivity was further improved. The FeTPP-modified electrode with heat-treatment improved the resistance the most (reduced by about 50%).

TABLE I

| Electrode | Resistance (mΩ) |
|---|---|
| MB (Control) | 93.5 ± 2.8 |

TABLE I-continued

| Electrode | Resistance (mΩ) |
|---|---|
| MB with FeTPP | 80.2 ± 2.5 |
| MB with FePc | 85.4 ± 2.0 |
| MB with CoPP | 82.5 ± 2.0 |
| MB with FeTPP heat-treated | 50.2 ± 2.0 |
| MB with FePc heat-treated | 67.2 ± 2.0 |
| MB with CoPP heat-treated | 58.2 ± 2.0 |

EXAMPLE 2

Figure 2:
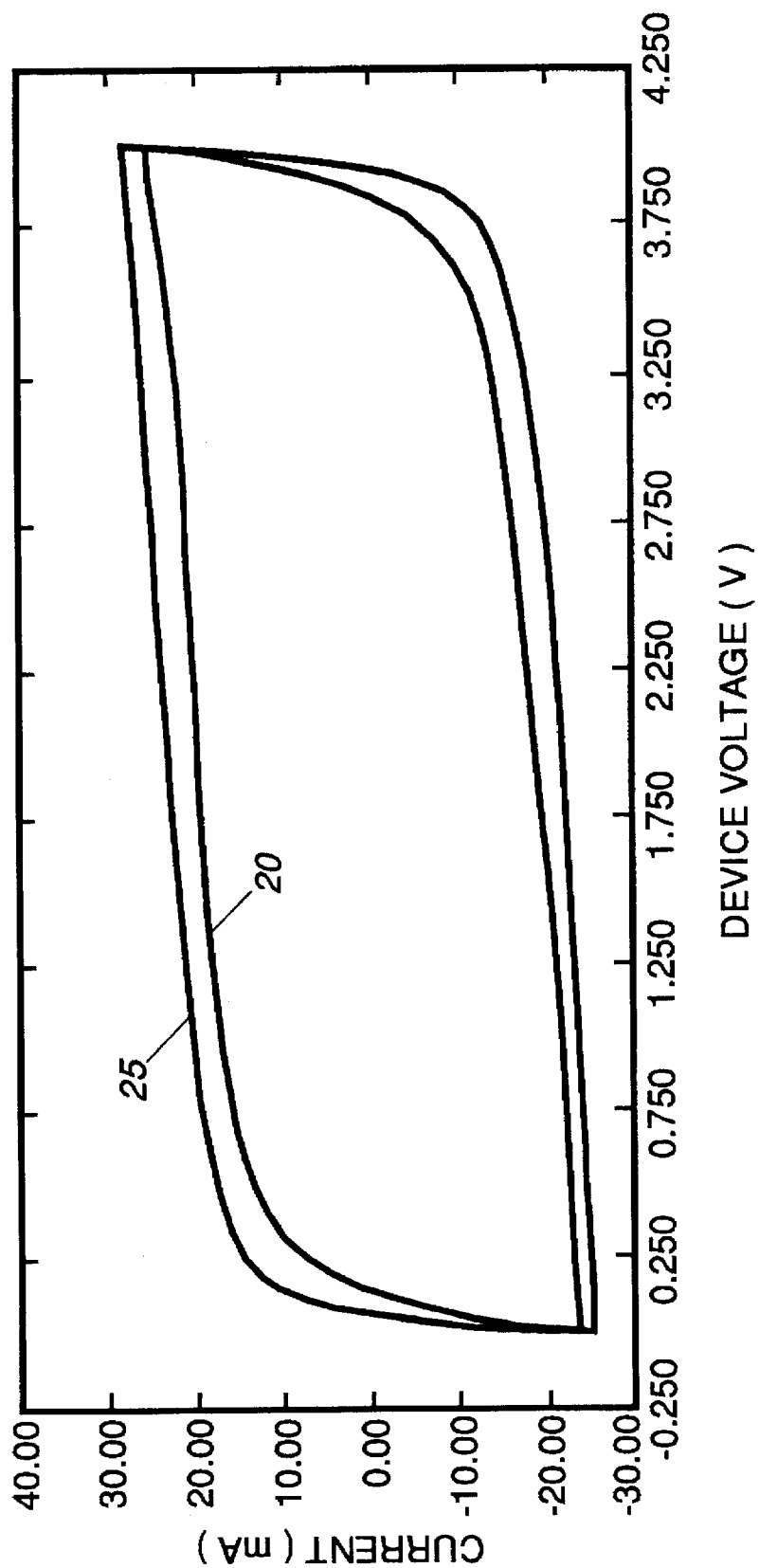
FIG. 2 is a cyclic voltammogram of a five cell device containing $RuO_2$ electrodes in accordance with the invention.

To demonstrate the performance of macrocyclic compound-treated electrodes and their devices, two 5-cell capacitor devices were made from the heat-treated FeTPP-modified and plain electrodes, respectively. The thickness of the PBI electrolyte was about 0.1 mm. The equivalent series resistance (ESR) measured for both devices with and without FeTPP modification were 86 and 158 milliohms, respectively. The surface area of each devices was 2.75 cm$^2$. The equivalent unit resistances for these devices are 47 and 87 milliohms/cm$^2$/cell, respectively. Additionally, the CV curves for the device made from heat-treated FeTPP-modified electrodes were very well shaped (FIG. 2). The device capacity made from the macrocyclic-modified electrodes 25 was 20% greater than that of the unmodified 20 electrode. We believe that the ESR reduction for the modified device was due to both electronic and electrocatalytic properties of the heat-treated FeTPP. The products from the heat-treatment of the FeTPP form a coordination network of electrochemical reaction centers for enhanced conductivity and electrochemical reversibility. This treatment is especially useful for capacitor electrodes in pulse power applications, which require electrochemical cells with high reversibility and low ESR. The capacity increase for the capacitor device may be due to the partial decomposition of the FeTPP. Gases generated from the decomposition during heat-treatment reconstruct the porous structure to produce, for example, more electrolyte accessible pores and less dead-end pores.

EXAMPLE 3

Figure 3:
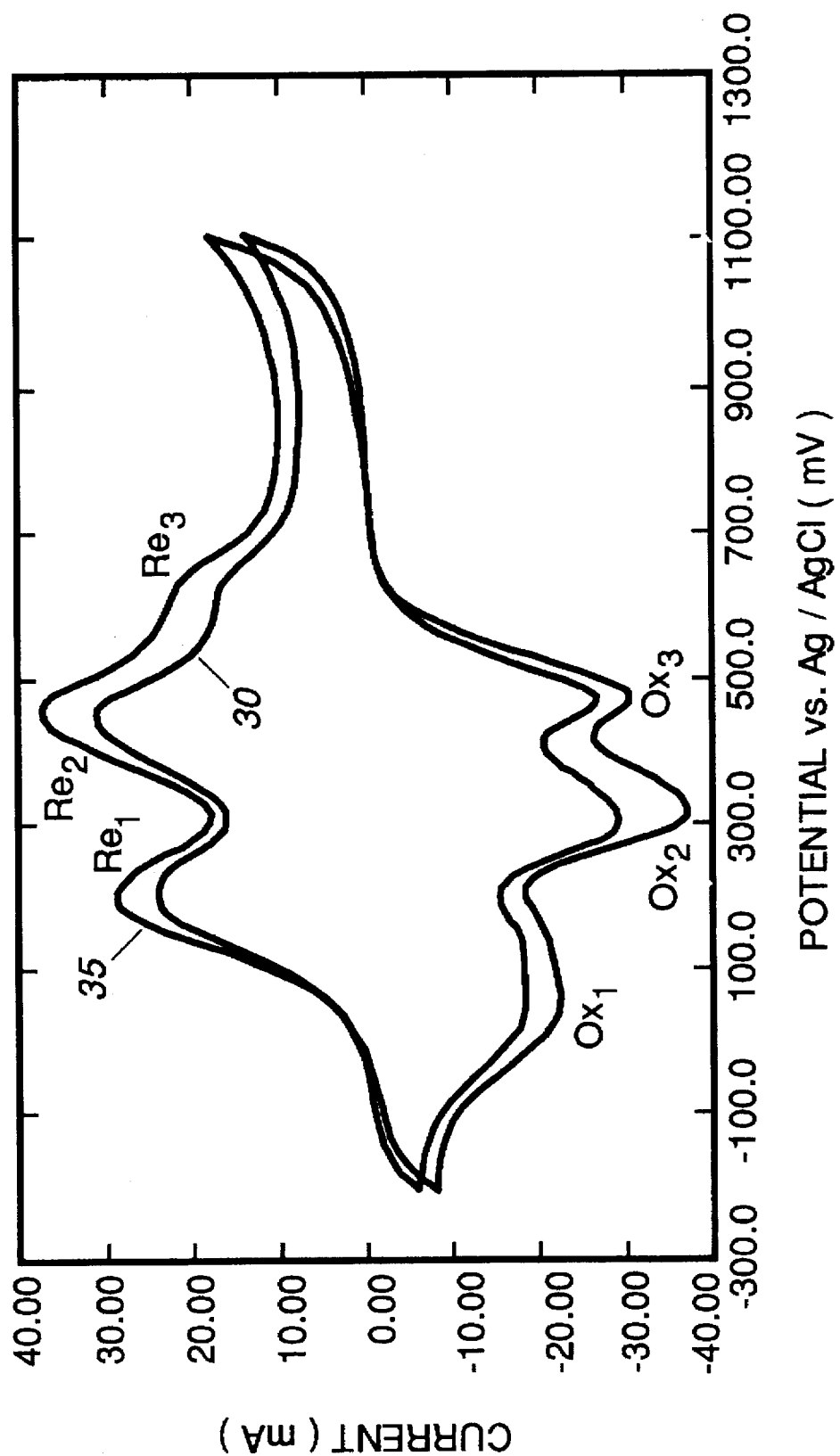
FIG. 3 is a cyclic voltammogram of a 1 molar poly(o-anisidine) electrode in accordance with the invention.

Conductive polymer electrodes, poly(o-anisidine)/graphite sheet substrate, were tested in 1M $H_2SO_4$. CV curves for electrodes with and without modification of FeTPP are shown in FIG. 3. The charge storage capacity of the poly(o-anisidine)/graphite electrode 35 after macrocyclic modification increased by 20% over the unmodified 30 electrode. Generally, the peak potential differences between reduction waves ($Re_1$, $Re_2$, and $Re_3$ in FIG. 3) and their corresponding oxidation ones ($Ox_1$, $Ox_2$, and $Ox_3$) for the modified electrode should be larger than that of the non-modified one, since the larger peak current for the former could cause higher IR drop. These results show that the peak potential differences after modification was even smaller, for example, the peak potential difference between $Re_2$ and $Ox_2$ after modification decreased by approximately 20 mV, indicating the FeTPP modification improved both the reversibility and conductivity of the polymer electrode.

EXAMPLE 4

Figure 4:
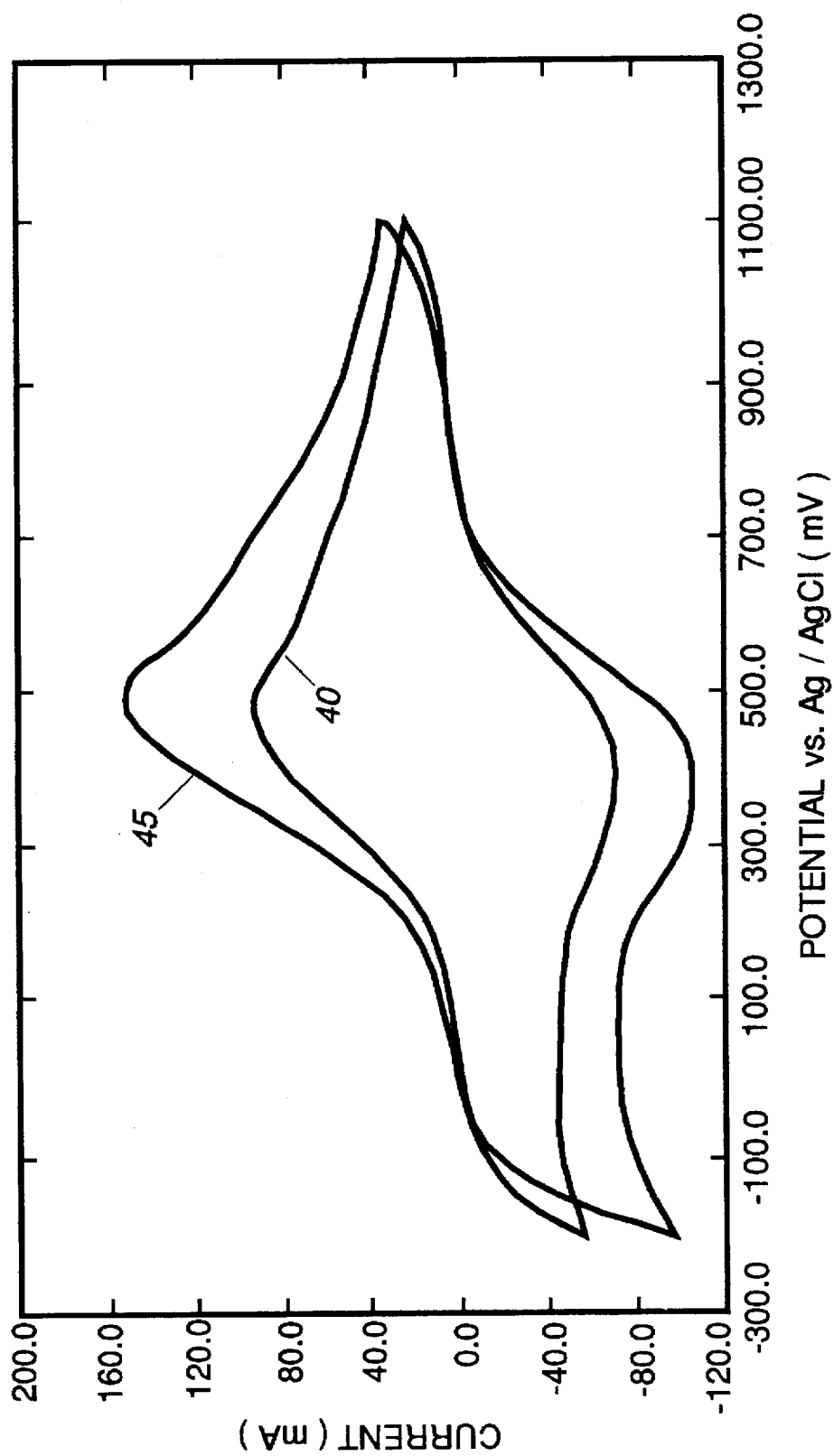
FIG. 4 is a cyclic voltammogram of a 1 molar polyaniline electrode in accordance with the invention.

Polyaniline/Ti electrodes were tested in 1M $H_2SO_4$. CV curves for electrodes with and without modification of FeTPP are shown in FIG. 4. The charge storage capacity of the polyaniline electrode after modification 45 increased by 62% over the unmodified 40 electrode. The peak potential difference between reduction and oxidation waves for the modified electrode should be larger than that of non-modified one, indicating the FeTPP modification improved both reversibility and conductivity of the polymer electrode.

EXAMPLE 5

Figure 5:
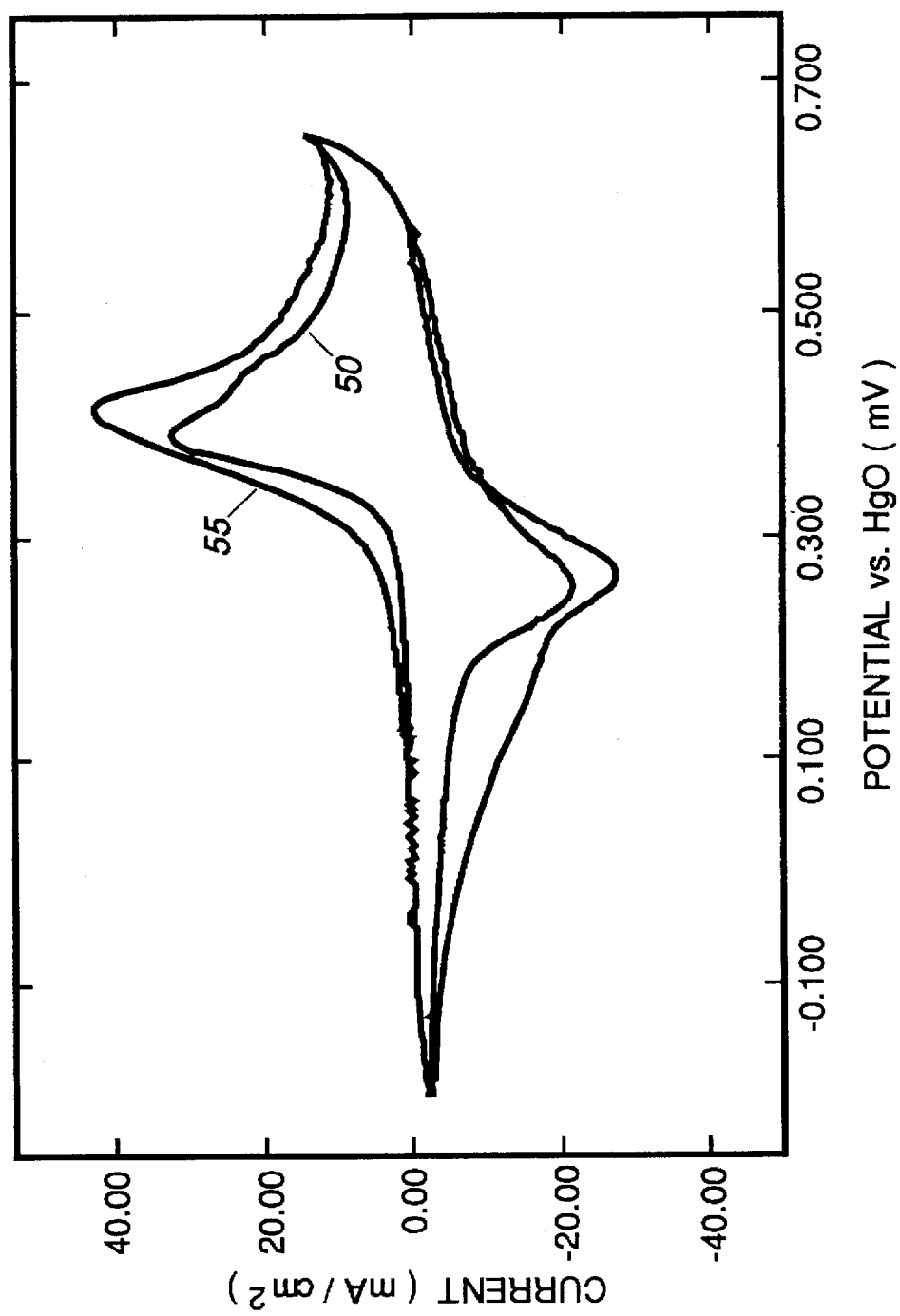
FIG. 5 is a cyclic voltammogram of a cobalt-nickel alloy electrode in 30% KOH in accordance with the invention.

Co—Ni alloy electrodes were tested in 31% KOH. The peak current of the electrode 55 after modification with FeTPP and heat treatment was dramatically increased over the control 50, resulting in a capacity increase of 58% (FIG. 5). The results also demonstrate that the reversibility and intrinsic resistance of the electrode after modification was improved, since the peak potentials for both reduction and oxidation waves with much greater peak currents after modification did not change.

In summary, metal macrocyclic complexes such as FeTPP, FePc and CoPP with or without heat-treatment have been shown to be useful for modifying capacitor electrode materials. The devices made from these modified electrodes have the significantly lower ESR and improved reversibility. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A surface modified electrode for a electrochemical capacitor, comprising:

an electrically conductive base selected from the group consisting of Al, Ta, Ti, Zr, Bi, W, Fe, Ni, Cu and alloys thereof, and graphite;

a portion of said base having a coating of one or more materials selected from the group consisting of Ru, Ir, Pt, Co, W, V, Fe, Ni, Mo, Ag, Zn, Pb, Mn, alloys thereof, oxides thereof, nitrides thereof, carbides thereof, conductive polymers and combinations thereof; and said coating modified with a metal macrocyclic complex comprising phthalocyanine or porphyrin ligands bound to a metal selected from the group consisting of Co, Ni, Fe, Cu, Zn, Mn, Ti, Ru, Al, Ag, Cd, Cr, In, Mg, Pd, Pt, Rh, Si, Sn and V.

2. The surface modified electrode as described in claim 1, wherein said metal macrocyclic complex is iron phthalocyanine, iron meso-tetra(N-methyl-4-phenyl) porphyrin, cobalt protoporphyrin, or nickel protoporphyrin.

3. The surface modified electrode as described in claim 1, wherein the conductive polymer is polyaniline, polypyrolle, or poly(o-anisidine).

4. The surface modified electrode as described in claim 1, wherein said porphyrin ligands are selected from the group consisting of phthalocyanines, porphyrins, or dibenzotetraazoannulenes.

5. A surface modified electrode for a electrochemical capacitor, comprising:

an electrically conductive base selected from the group consisting of Al, Ti, Ni and stainless steel and alloys thereof;

a portion of said base having a coating of ruthenium dioxide; and said coating modified with a metal macrocyclic complex comprising iron phthalocyanine, cobalt phthalocyanine, iron protoporphyrin cobalt protoporphyrin, or nickel protoporphyrin.

6. An electrochemical capacitor having a surface modified electrode, comprising:

first and second symmetric electrodes selected from the group consisting of Ru, Ir, Pt, Co, W, V, Fe, Ni, Mo, Ag, Zn, Pb, Mn, oxides thereof, nitrides thereof, carbides thereof, alloys thereof, conductive polymers, carbon material, and combinations thereof;

the surface of at least one electrode modified with a transition metal macrocyclic complex to enhance the reversibility of a redox reaction occurring at the surface of the electrode; and an electrolyte disposed between and contacting the first and second symmetric electrodes.

7. The capacitor as described in claim 6, wherein the electrolyte is a solid electrolyte or a gel electrolyte.

8. The capacitor as described in claim 6, wherein the electrolyte is an acidic liquid electrolyte or a basic liquid electrolyte.

9. An electrochemical capacitor having a surface modified electrode, comprising:

first and second symmetric ruthenium dioxide electrodes;

the surface of the electrodes modified with iron meso-tetra(N-methyl-4-phenyl)porphyrin; and a polymer electrolyte comprising $PBI/H_3PO_4$ or $PVA/H_3PO_4$ disposed between and contacting the first and second symmetric electrodes.

* * * * *